UNITED STATES PATENT OFFICE.

BENJAMIN F. SHAW, OF CAMBRIDGE, MASSACHUSETTS.

IMPROVEMENT IN THE MANUFACTURE OF GLUE.

Specification forming part of Letters Patent No. 145,454, dated December 9, 1873; application filed June 6, 1873.

*To all whom it may concern:*

Be it known that I, BENJAMIN F. SHAW, of Cambridge, in the county of Middlesex and State of Massachusetts, have invented an Improvement in the Manufacture of Glue; and I do hereby declare that the following is a description of my invention sufficient to enable those skilled in the art to practice it.

My invention or improvement relates to a new method of manipulating glue during the process of drying, and is applicable especially to glues of the lower grades. These glues are commonly wanting, wholly or largely, in gelatinizing power, in consequence of the inferiority of the materials from which they are extracted, or of the long boiling or other treatment to which they have been subjected. Firm and strong jellies may be sliced, and the slices or sheets placed upon nets to dry; but the weaker and longer-boiled gelatines which do not jellify are sliced only with difficulty, if at all, and their slices are so viscid as to make the handling of them disagreeable and difficult. If placed upon nets, the slices of these weak gelatines are apt to melt and run when exposed to moist warm air. Solutions of strong gelatines may be poured into pans, and, after cooling and setting, removed with very little skill to nets for the purpose of drying; or the gelatine may be allowed to remain in the pans to dry, and it will commonly separate from the pans in the contraction of drying. But solutions of the poorer, viscid, or gummy gelatines, do not set, though they become cool; and the removal of sticky gelatine as a sheet or cake from a pan into which the solution was poured is attended with difficulty.

In the patent No. 133,896, issued to me December 10, 1872, I mentioned the use of kerosene as an aid in removing the glue-cake. I have found, however, that, even if the pan be greased or oiled, the difficulty is not entirely obviated, for the hot gelatine melts the grease and forces it toward the upper part of the sides of the pan, so that the gelatine comes into contact with the unprotected surface of the central part of the pan, and sometimes adheres to it with scarcely less tenacity than if no grease had been applied. And it is found, on attempting to remove the glue in such a case, after the length of time that could practically be allowed for the glue to remain in the pan, that, while a more or less tough coating has formed upon the exposed surface of the glue, the next lower stratum, and the under surface in contact with the pan, are not hardened, but remain gummy and sticky. If the glue in such a case be left in the pan until quite dry throughout, which requires time enough to admit of the escape of all the moisture through the upper and only exposed surface, it is commonly found that it adheres to the pan with great tenacity, and can only be removed by pounding, cracking, scraping or digging. In this, much labor is expended, and the pans are liable to serious injury.

The method not unfrequently followed to obviate the difficulties mentioned, is to mix a solution of the viscid gelatine with a solution of a strong gelatine, in about equal proportions, by boiling good glue-stock in a solution of the weaker glue, so that the superior qualities of the good glue extracted may be availed of to correct the viscidity of the mass containing the poor gelatine, and impart gelatinizing power thereto by thorough admixture with it. But there are circumstances under which the manufacture of a superior gelatine, in conjunction with the inferior ones described, is undesirable or impossible, and it would not be economical to dissolve manufactured glue and mix the solutions in the required proportions. A process has been wanted which should make easy the removal from the pans of the sticky glue, and a process that should involve the use of very little additional material, and that of a kind not deleterious to the product. My process meets all of these requirements.

I rub the pans with a rag greased with clean gease, tallow, lard, or oil. I then size their inner surfaces, including their sides, with a solution of strong glue, so as to leave an unbroken coating over the whole of this surface. I apply the size with a wide soft brush, or by pouring some of the solution into and out of the pan. I then place the pans in a cool place where the coating will become firm and partially dry, but not dry enough to peel by the time it is desired to fill them. The glue to be poured into them, having been evaporated to a thick state, is allowed to become as cool as it can be to be poured conveniently from one vessel to another, and is then poured into the pans to the depth of from one-fourth to one-half an inch, or as may be deemed best by the workman.

If the solution poured in be too hot, or if it be too dilute, the coat of sizing is apt to dissolve entirely in and become mixed with it, and the desired action of it is obviously prevented or impaired. If the solution be too dilute, and at the same time the quantity put into each pan be too great, the time required to dry the glue so that it may be removed from the pan will be inconveniently long, even if the coating does not dissolve and render difficult the removal of the glue, as hereinbefore mentioned. I have found that a good coating is made of two parts of a glue having the strength of Peter Cooper's No. $1\frac{1}{4}$, dissolved in three parts of water. I apply it hot, in a warm room, and then put the pans into a colder room, with thermometer at 60°, where I leave them a few hours. I consider that the degree of concentration required in the solution with which the pans are to be filled, is indicated by the persistence with which a hot drop of it retains its globular form when dropped upon paper or other smooth substance of the temperature of the warm room. When the drop stands up full and rounded, and stiffens immediately, I regard the concentration as sufficient. I then allow the mass to cool down, as mentioned above, and remove it to the pans.

In pouring in the glue, I distribute the falling current over as much of the surface of the pan as possible; for, if the whole inflow were to strike at any one point, the coating at that point would dissolve and disappear. A convenient vessel to pour from is one having a wide straight-edged lip or spout. The pans being now filled, are placed upon racks in a drying-room. The higher the temperature of the room, the drier the air, the more of it, and the better the circulation, the quicker the glue will dry, though the glue is not improved by a temperature above 100°, and is injured by one above 212° Fahrenheit. After subjection to a temperature of 80° to 90°, and the drying air for for ten hours, the pans are subjected to an air of lower temperature, or to other cooling agency, whereupon the glue becomes firmer, and therefore better fitted for handling. It is now found that the upper surface has been formed into a dry and somewhat tough coating, and that this coating is united with the coat of sizing when the two coatings meet upon the sides of the pan, so that the two coatings together form a closed sac, within which is the softer and sticky portion of the glue.

By starting the coating from the sides of the pan, the fingers may be inserted between the glue and the pan, and the glue easily removed and placed upon nets, where the drying of it is completed. Having passed through the high temperature of the first drying process, and having a good firm coating, skin, or pellicle upon all sides, there is little or no danger that the cakes will melt in any change of the atmosphere.

When the size is made of clear light-colored glue, it is sometimes impossible to detect the coating it forms on the cake of which it is a part, and I believe that in nearly all cases it dissolves partially and is partially incorporated with the glue placed in contact with it.

My invention consists, therefore, in forming upon that part of the surface of the glue which is next the pan a coating that is complementary to the skin or coating which is formed by natural tendency at the surface exposed to the air, and by this means inclosing completely within a case, film, or sac, the softer and sticky portion of the mass, so that it may be removed and handled with facility.

I do not intend to limit my claim to the use of any particular kind or source of material in forming this film or crust, nor to the particular mode of formation, application, or subsequent manipulation described; nor to the kind of pan, or its equivalent, used to receive the glue; nor to any proportion to be observed between the coating and the superimposed glue; nor to any particular application of air or heat, having described what I believe to be the best.

What I claim as my invention, and desire to secure by Letters Patent is—

The formation of a coating, film, pellicle, or crust for the unexposed surface of gelatine or glue in the process of manufacture and desiccation, for the purpose mentioned.

B. F. SHAW.

Witnesses:
  FRANCIS GOULD,
  M. W. FROTHINGHAM.